United States Patent [19]
Aoyama et al.

[11] Patent Number: 5,122,903
[45] Date of Patent: Jun. 16, 1992

[54] OPTICAL DEVICE AND OPTICAL PICKUP DEVICE USING THE SAME

[75] Inventors: Shigeru Aoyama; Tatsuo Ohgaki, both of Takatsuki; Tukasa Yamashita, Nara, all of Japan

[73] Assignee: Omron Corporation, Kyoto, Japan

[21] Appl. No.: 492,489

[22] Filed: Mar. 12, 1990

[30] Foreign Application Priority Data

Mar. 15, 1989 [JP] Japan .................. 1-64571
Feb. 16, 1990 [JP] Japan .................. 2-36741

[51] Int. Cl.$^5$ .............. G02B 5/18; G02B 3/08; G02B 27/44
[52] U.S. Cl. .................. 359/565; 359/569; 359/575; 359/742; 369/109
[58] Field of Search ........... 350/162.16, 162.17, 350/162.2, 452; 369/109

[56] References Cited

U.S. PATENT DOCUMENTS

| | | | |
|---|---|---|---|
| 1,483,636 | 2/1924 | Horni | 350/452 |
| 1,944,154 | 1/1934 | Dickson | 350/452 |
| 3,020,395 | 2/1962 | Peltz | 350/452 |
| 3,504,606 | 4/1970 | Macovski | 350/162.17 |
| 3,533,340 | 10/1970 | Macovski | 350/162.17 |
| 3,536,371 | 10/1970 | Post | 350/162.16 |
| 3,603,668 | 9/1971 | DeBitetto | 350/162.2 |
| 3,839,108 | 10/1974 | Leinkram | 350/162.16 |
| 4,082,433 | 4/1978 | Appeldorn et al. | 350/452 |
| 4,130,346 | 12/1978 | Polley | 350/452 |
| 4,448,485 | 5/1984 | Bergman et al. | 350/452 |
| 4,733,943 | 3/1988 | Suzuki et al. | 350/162.16 |
| 4,737,447 | 4/1988 | Suzuki et al. | 350/452 |
| 4,869,568 | 9/1989 | Schimpe | 350/162.2 |
| 4,871,233 | 10/1989 | Sheiman | 350/452 |

OTHER PUBLICATIONS

Rogers, "The Manufacture of a Stepped Zone-Plate," *J. Scientific Instruments*, vol. 43, 1966, pp. 328-329.
M. G. Moharam et al., "Diffraction Characteristics of Photoresist Surface-Relief Gratings", Applied Optics, vol. 23, No. 18, Sep. 15, 1984, pp. 3214-3220.
Ono et al, "Birefringement Grating Polarizer", Microoptics News, Bishyo-Kogaku Kenkyu Group, vol. 7, No. 3, Oct. 12, 1989, pp. 30-35.

*Primary Examiner*—Bruce Y. Arnold
*Assistant Examiner*—Martin Lerner
*Attorney, Agent, or Firm*—Dickstein, Shapiro & Morin

[57] ABSTRACT

An optical element having a substrate and a composite grating pattern formed thereon. The pattern is constituted with two different kinds of grating patterns superimposed on the substrate. When one of the two kinds of grating patterns is formed in a Fresnel lens pattern, a light focusing or collimating function (i.e. a lens function) is implemented. When the other pattern is formed in an equally separated linear grating pattern, the optical element develops the lens function and a function to diffract lights through the linear grating. When one of the two kinds of grating patterns is formed in a Fresnel lens pattern and the other pattern is implemented in an unequally separated linear grating pattern, a lens function to focus lights onto a point and a cylindrical lens function to focus lights in a linear contour are obtained. Consequently, when parallel lights are incident to the optical element, there occurs astigmatism.

9 Claims, 18 Drawing Sheets

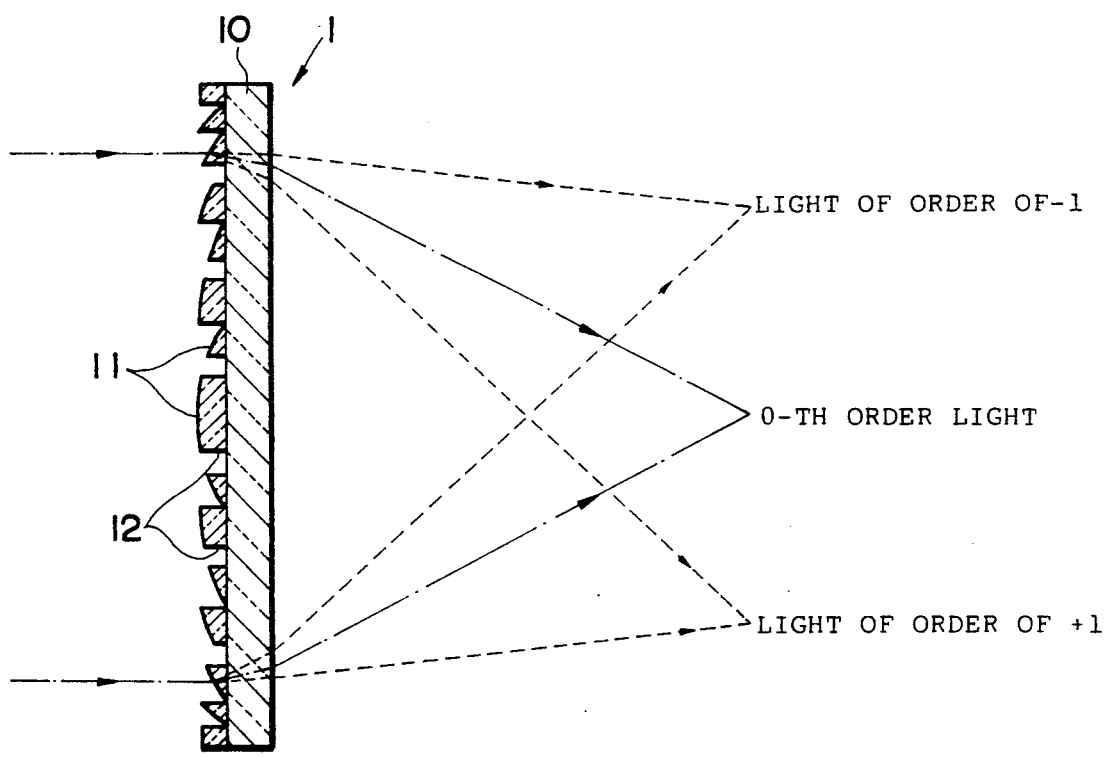

Fig.14a
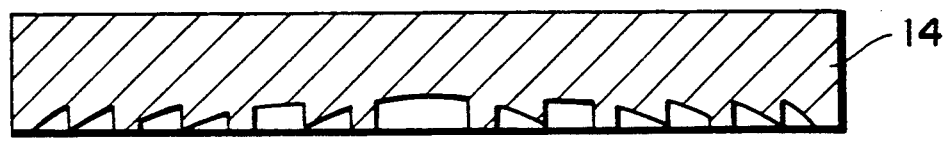
Fig.14b
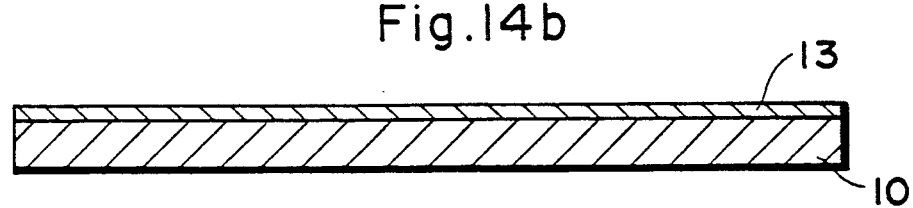
Fig.14c
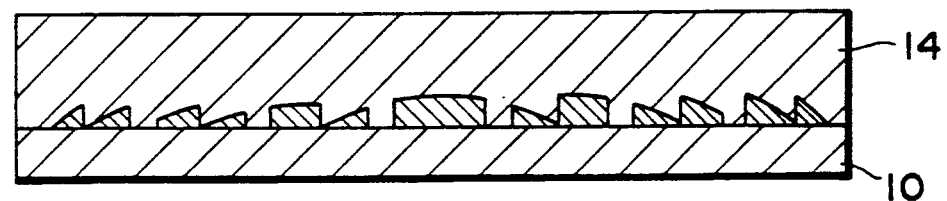
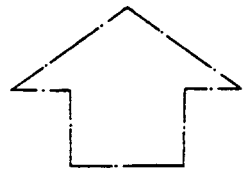
ULTRAVIOLET RAY

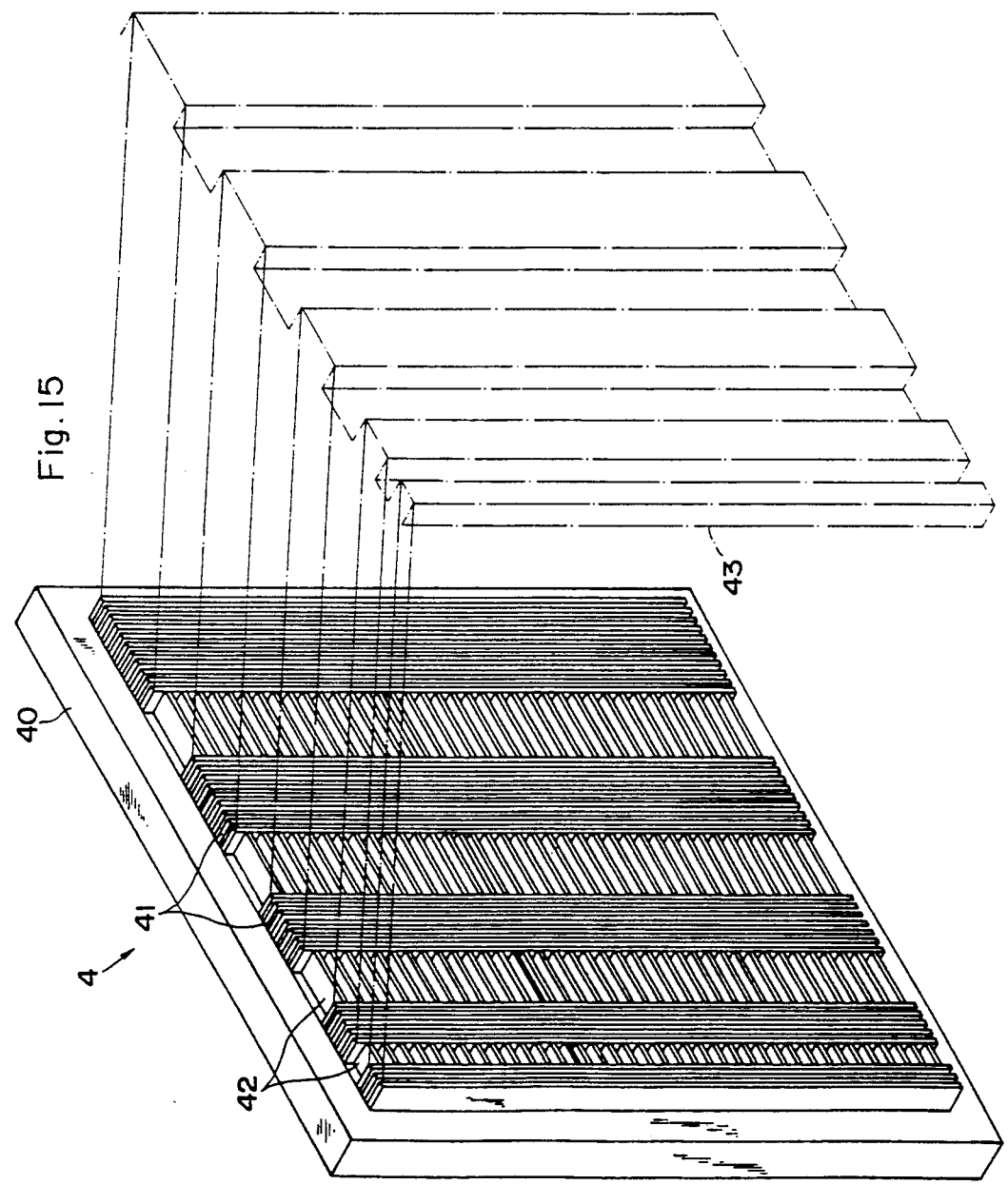

OPTICAL DEVICE AND OPTICAL PICKUP DEVICE USING THE SAME

BACKGROUND OF THE INVENTION

1. Field of the Invention

The present invention relates to an optical device and an optical pickup device employing the optical device.

2. Description of the Prior Art

An optical pickup device for reading data or information written on an optical recording medium such as an optical disk includes a semiconductor laser as a light source, a lens for collimating a light emitted from the semiconductor laser, an objective for creating a light spot on the optical recording medium, and a light receiving element for sensing a light which is reflected on the recording medium and which is attained via the objective. Furthermore, the device includes depending on a focusing error detection method and a tracking error detection method employed therein various optical devices such as a grating, a polarization light beam splitter, and a cylindrical lens. Since the optical pickup device is constituted with a combination of these various optical elements, an assembly operation including an optical axis adjustment is considerably complicated.

SUMMARY OF THE INVENTION

It is therefore, an object of the present invention to provide an optical device having two functions comprising a lens function and another optical function.

Furthermore, another object of the present invention is to provide an optical pickup device which employs an optical device having two optical functions such that the assembly operation is simplified and the device size is minimized.

In accordance with the present invention, there is provided an optical device including a substrate on which a composite grating pattern is configured by superimposing two different kinds of grating patterns.

The grating is implemented in a relief type (or a corrugation type) in which a light is diffracted by use of projected stripe portions (ridges) and grooves disposed on the substrate or in a refractive index distribution type in which the light diffraction is caused by a variation in the value of the refractive index in the substrate.

One of the two kinds of grating patterns is set as a Fresnel lens pattern so as to develop an operation to collect lights or a collimating operation (namely, a lens function). The other kind of grating pattern is created in a grating pattern with equally separated linear ridges. With the provision above, the lens function through the collimation and a light diffraction function through the linear grating are developed in this optical device.

When one of the two kinds of grating pattern is formed in a Fresnel lens pattern and the other is configured in a linear grating pattern with unequally separated linear ridges, a lens function to focus lights onto a point and a cylindrical lens function to focus lights in a linear form can be obtained. In consequence, when a collimated light is incident to this optical element, there occurs an astigmatism.

When using a high-density grating having a period between a wavelength to half the wavelength of an incident light, a Bragg diffraction takes place for an incident light having a particular polarization direction. That is, the high-density grating serves as a polarization light beam splitter or a polarization filter. When one of the two kinds of grating patterns is formed in a Fresnel lens pattern and the other is constituted in a high-density grating pattern, there is implemented an optical device developing a lens function and a polarized light beam splitter function.

An optical device in accordance with the present invention includes two kinds of ultra high-density gratings each being orthogonal to each other and having a period not exceeding half the wavelength of a light incident thereto. These two kinds of gratings have an identical thickness. A first kind of ultra high-density grating is arranged such that an envelope pattern thereof represents a third grating contour having an interval not less than the wavelength of the incident light. A second kind of ultra high-density grating is disposed in a portion associated with grooves of the third grating.

An ultra high-density grating develops a birefringence characteristic when a period thereof is not exceeding half the wavelength of a light incident thereto. Consequently, when the duty ratios of the two kinds of ultra high-density gratings above are selected such that the refractive index of the first kind of ultra high-density grating in a direction orthogonal to the grating is equal to the refractive index of the second kind of grating above in a direction parallel to the grating, only the light polarized to be parallel to the third grating is diffracted by the third grating. Lights associated with polarization in the other directions pass through the third grating. Resultantly, a function of a polarized beam splitter is realized.

When the third grating is implemented as a grating having unequally separated grating patterns, a cylindrical lens function is developed.

The optical device in accordance with the present invention can be adopted to configure an optical pickup device. Since the optical element is provided with two different types of optical functions, the size of the optical pickup device can be minimized and the assembly of the device is facilitated.

BRIEF DESCRIPTION OF THE DRAWINGS

These and other objects and advantages of the present invention will become apparent by reference to the following description and accompanying drawings wherein:

FIG. 2 is a cross-sectional view along a line II—II of the device shown in FIG. 1;

FIGS. 14a to 14c are explanatory diagrams for explaining a method of manufacturing the optical device above;

FIG. 15 is a perspective view illustratively showing an optical device as a fourth embodiment according to the present invention;

DESCRIPTION OF THE PREFERRED EMBODIMENTS

Figure 1:
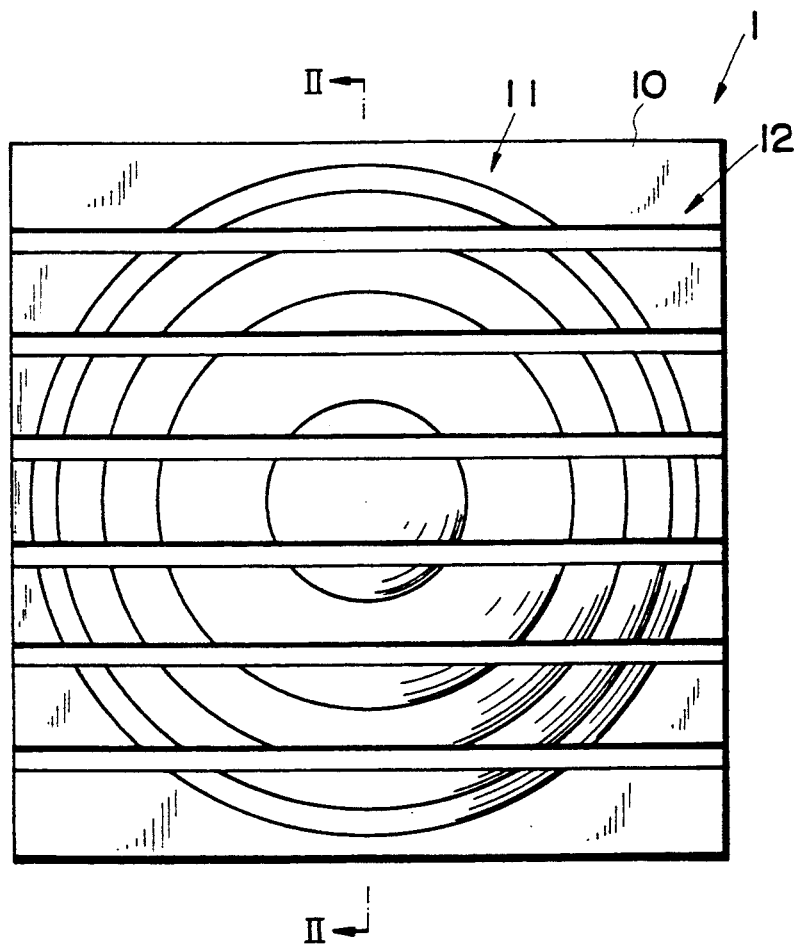
FIG. 1 is a schematic plan view showing an optical device as a first embodiment according to the present invention.

Referring now to FIGS. 1 and 2, a description will be given of a first embodiment of the optical device according to the present invention.

The device includes a substrate 10 which is transparent with respect to a light incident thereto. On a surface of the substrate 10, a grating 11 (having Fresnel lens patterns) is formed in a circular contour to develop a function of a micro Fresnel lens. Moreover, a grating 12 is configured in a linear contour thereon. These gratings 11 and 12 are manufactured in a relief type in which a projected stripe and a groove appears in an alternate fashion.

Figure 3A:
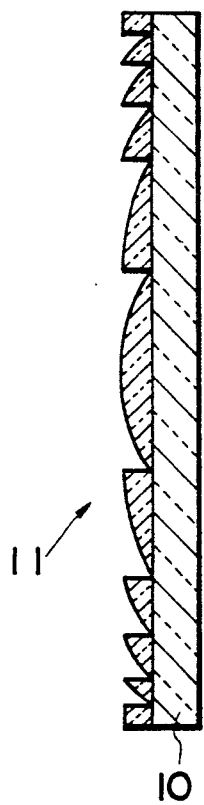
FIG. 3a is a cross-sectional view of a micro Fresnel lens.
Figure 3B:
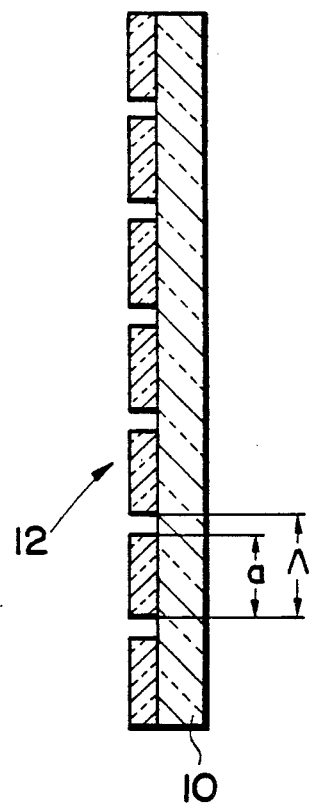
FIG. 3b is a cross-sectional view of a grating with equally separated patterns.

For an easy understanding, FIGS. 3a and 3b show cross-sectional views of the micro Fresnel lens and a linear grating, respectively. In the diagram of FIG. 3a, the grating 12 of the micro Fresnel lens has a grating period, which is smaller in the periphery thereof and is blazed. The linear grating 12 is, as can be seen from FIG. 3b, manufactured in a stepping type with a fixed period Λ. These two kinds of gratings 11 and 12 are overlapped with each other with the groove taking precedence in the overlapping, so that the grating (with composite grating patterns) is constituted in the optical device 1 shown in FIGS. 1 and 2. In this structure, the gratings 11 and 12 possesses a period not less than a wavelength λ of the incident light.

Naturally, the Fresnel lens patterns may be formed in a stepping contour (rectangular shape) and the linear grating may be blazed.

When the collimated light beam enters the optical element 1, the light is diffracted through the Fresnel lens pattern 11 such that the resultant light of the first order is focused onto a focusing point associated with the pattern 11. The diffraction of the collimated incident light is also caused by the linear grating 12. Of the light diffracted through the linear grating 12, let us neglect the diffracted light of the second and higher orders. Namely, let us consider the light passing through the grating 12 (light of the 0-th order) and the diffracted light of the i-th order, where $i = \pm 1$. The light passing through the grating 12 is focused by the Fresnel lens pattern 11 as designated by dot-and-dash lines in FIG. 2. The remaining diffracted light of i-th order beams are also focused, as indicated with broken (dot) lines, through the Fresnel lens pattern 11 onto points other than the focus point of the passing light above. As above, the light incident to the optical device 1 is split into three light beams, which are focused onto the three different points.

Intensity of each of the passing light and the diffracted beams of the i-th order with $i = \pm 1$ through the grating 11 having the linear contour is determined depending on a duty ratio $a/\Lambda$ thereof in association with the following expression, where $\Lambda$ is a period of the grating, $a$ stands for a width of the projected stripe (ridge) portion, and $\eta$ designates a diffraction coefficient of either one of the diffracted beams of the i-th order with $i = \pm 1$.

$$\eta = (4\pi^2) \sin^2 [(a/\Lambda)\pi] \quad (1)$$

Figure 4:
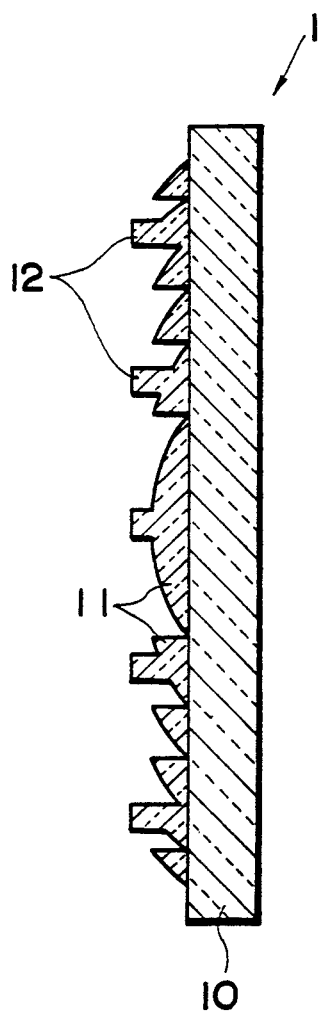
FIG. 4 is a cross-sectional view showing a variation of the optical device.

FIG. 4 shows a variation of the optical device 1 in which on a substrate 10, a Fresnel lens pattern 11 and a linear grating 12 are formed such that projected stripes of the pattern 11 and the grating 12 are respectively overlapped with each other.

Figure 5:
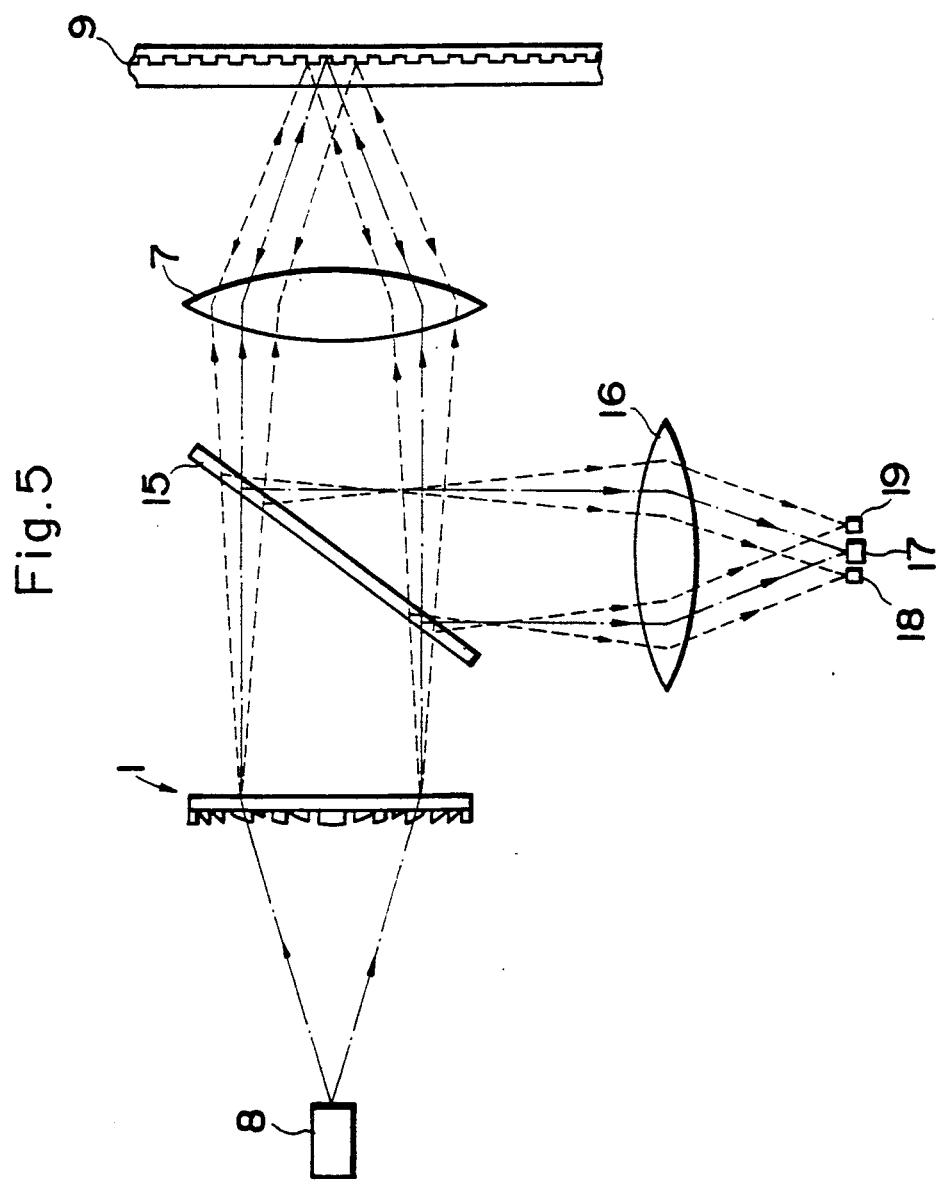
FIG. 5 is a diagram schematically showing the optical constitution of an optical pickup device adopting the optical element of FIG. 1.

FIG. 5 shows a constitution example of an optical pickup device including the optical element 1 described above.

This configuration includes a semiconductor laser 8 as a light source, which emits a laser beam. The emitted light enters the optical device 1 while expanding in the space. The optical device 1 splits the received laser light into three beams to be collimated. The semiconductor laser 8 produces a laser beam having a cross section in an elliptical shape. In order to shape the obtained laser beam into a collimated light having a cross section of a circular contour, a shaping optical system including a prism is provided or, the optical device 1 is preferably provided with a Fresnel lens pattern having an elliptical cross section.

The three beams generated from the optical element 1 are transmitted through a beam splitter 15 so as to be respectively focused by an objective 7 onto three different positions on an optical disk 9, which then reflects these beams. Three reflected beams are sent from the optical disk 9 through the objective 7 and are then deflected by the beam splitter 15 so as to be respectively focused by a light receiving lens 16 on three light receiving elements 17, 18, and 19, respectively. The central light receiving element 17 includes four light receiving potions, which are independent of each other. The central 17 element produces output signals, which are employed to generate a read-out signal and a focusing error signal. The other light receiving elements 18 and 19 creates output signals to be used to obtain a tracking error signal.

Figure 6:
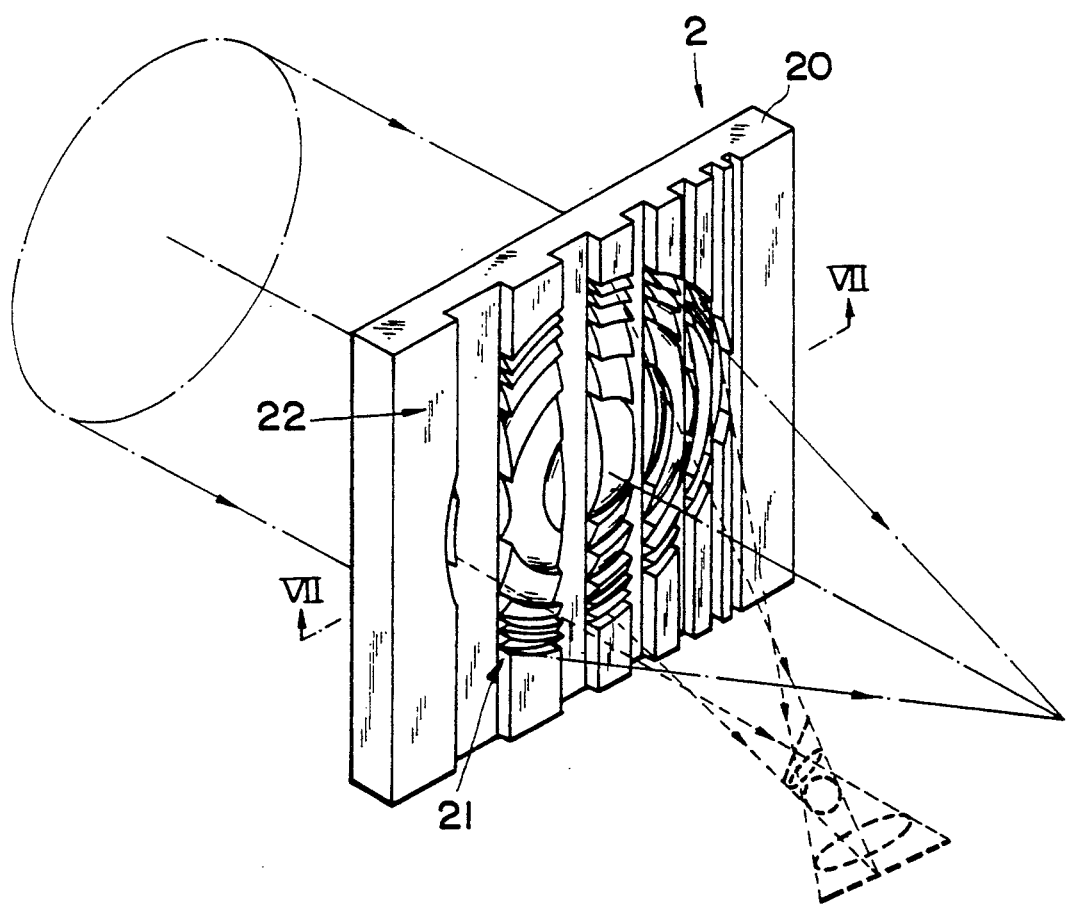
FIG. 6 is a perspective view showing an optical device as a second embodiment in accordance with the present invention.
Figure 7:
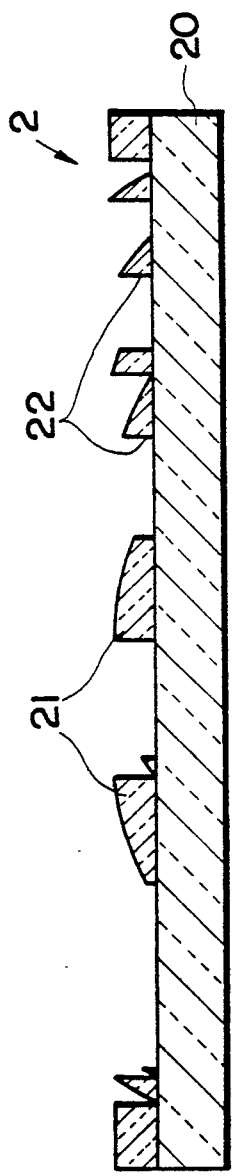
FIG. 7 is a magnified cross-sectional view along line VII—VII of the device of FIG. 6.

FIGS. 6 and 7 illustratively show a second embodiment in accordance with the present invention.

In these diagrams, on a transparent substrate 20, a Fresnel lens pattern 21 and a grating 22 in an unequally separated linear patterns are formed so as to be superimposed or overlapped with each other with the grooves thereof taking precedence in the overlapping. In this embodiment, the unequally separated grating structure 22 has a grating interval (period), which is reduced along a direction from one side to the other side of the substrate. As other examples of gratings with unequally separated patterns, there may be adopted a grating configuration in which the grating interval becomes to be smaller along a direction from both side portions to the central portion of a grating structure in which conversely, the interveal is increased along the direction above.

When a parallel light is incident to the optical element 2 thus constructed, a light beam passing through the grating 22 is focused by the Fresnel lens pattern 21 on an optical axis thereof as denoted by dot-and-dash lines in FIG. 6. A diffracted light of the first order produced from the grating 22 is focused, as indicated by broken lines in FIG. 6, onto a position separated from the optical axis of the Fresnel lens such that the collected light causes astigmatism. This is because the unequally separated grating structure 22 serves a function of a cylindrical lens, namely, the focal distance varies between two directions orthogonal to the optical axis.

Figure 8:
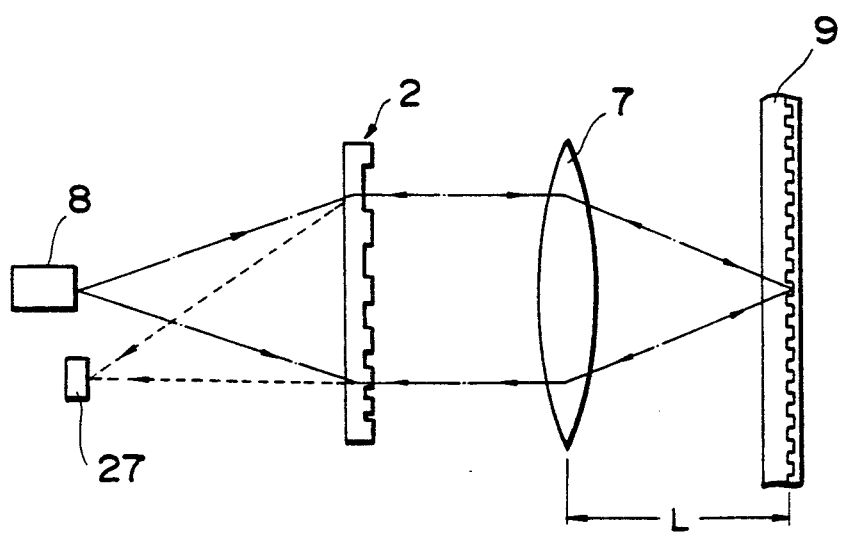
FIG. 8 is a schematic diagram showing the optical constitution of an optical pickup device using the optical element of FIG. 6.

FIG. 8 shows the constitution of an optical pickup device employing the optical element 2 as a constituent component.

In this system, a semiconductor laser 8 emits a light, which enters the optical element 2. Of the light thus received by the element 2, a light passing through an unequally separated grating structure 22 (a light of the 0-th order) is collimated by the Fresnel lens pattern 21. It is favorable that the Fresnel lens pattern has an elliptical contour. The collimated light is collected by the object 7 so as to create a light spot on the optical disk 9. A light reflected then from the optical disk 9 is sent via the objective 7 to the optical element 2. The reflected light is diffracted through the optical element 2. In this constitution, a light receiving element 27 is disposed at a location such that the diffracted light of the first order (the first-order diffracted light attained from the unequally separated grating structure 22) is incident to the light receiving element 27.

The light receiver 27 includes four light receiving portions, which produce four signals associated with the light reception. Based on the four light reception signals from the light receiving element 27, the system generates a focusing error signal in an astigmatic method. That is, when a distance between the objective 7 and the optical disk 9 is equal to be focal distance of the objective 7, the reflected light from the optical disk 9 is appropriately collimated throught the objective 7 so as to enter the light receiving element 27. Consequently, a circular light spot is developed on the light receiving element 27. However, when the distance L varies, the reflected light is not correctly collimated by the objective 7 and hence the light enters the optical element 2 in an inclined direction with respecto to the axis of the optical element 2. In consequence, an elliptical light spot is generated on the light receiving surface of the element 27. The tracking error signal is produced by use of a push-pull (far field) method. That is, the four light receiving portions of the light receiver 27 are classified into two groups so as to generate a difference between the respective total signals of the two groups, thereby creating a tracking error signal. A read-out signal is produced by adding four output signals from the four light receiving portions.

In the embodiment above, although a combination of a circular or elliptical grating pattern and a linear grating pattern is adopted to form a composite grating pattern of the optical element, there may be employed arbitrary pattern contours for these patterns. For example, in place of the linear grating pattern, a grating pattern having a shape of an arc may be used.

Figure 9:
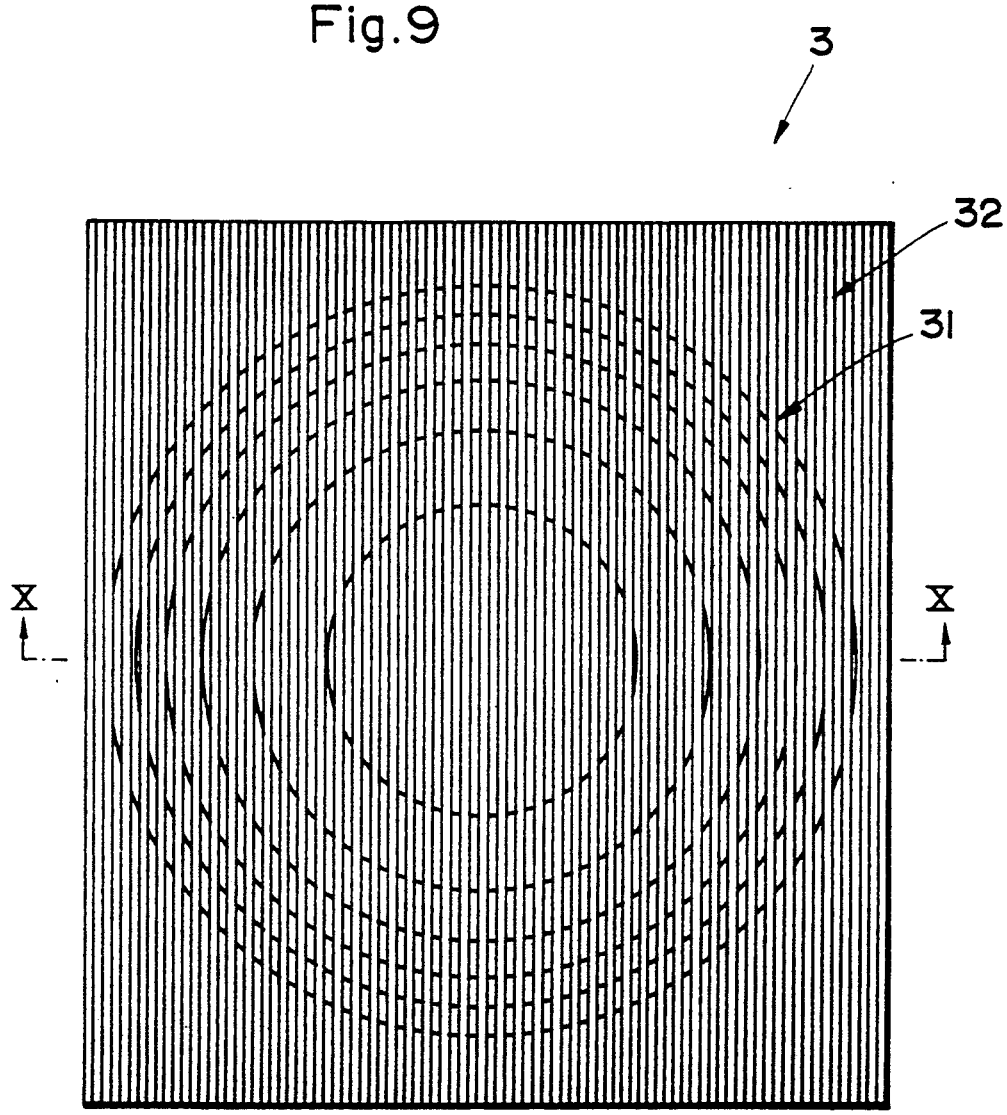
FIG. 9 is a plan view showing an optical device as a third embodiment in accordance with the present invention.
Figure 10:
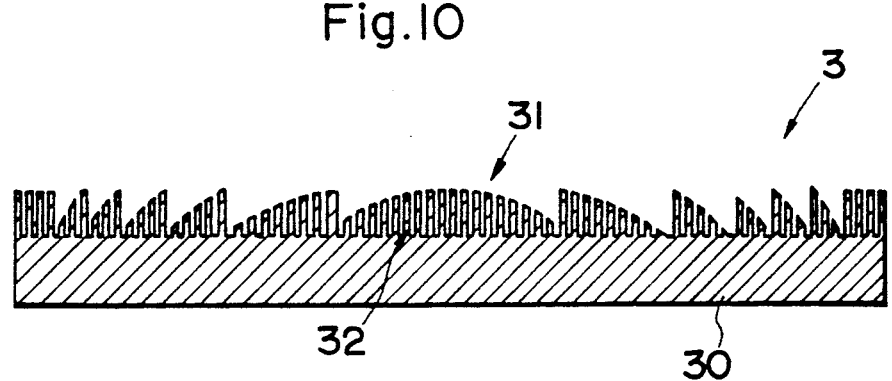
FIG. 10 is a cross-sectional view along line X—X of the optical device of FIG. 9.
Figure 11:
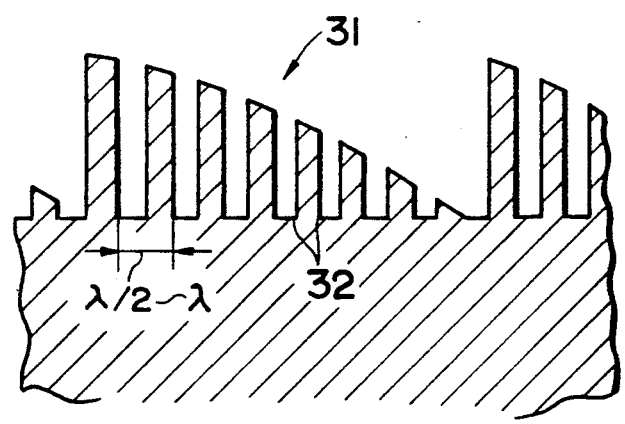
FIG. 11 is a magnified view illustratively showing a portion of the device of FIG. 10.

FIGS. 9 to 11 show a third embodiment of the optical device in accordance with the present invention.

In this configuration, a high-density linear grating 32 with a period ranging from a wavelength $\lambda$ to half the wavelength $\lambda/2$ of an incident light is superimposed on to a Fresnel lens pattern 31 (in which the thickness of the linear grating 32 is modulated by the thickness of the Fresnel lens pattern 31) so as to form a composite grating pattern on a substrate 30. Since the linear grating 32 having a high spatial frequency has a period not exceeding the wavelength $\lambda$, the light is not diffracted therethrough in a sense described above.

Figure 12:
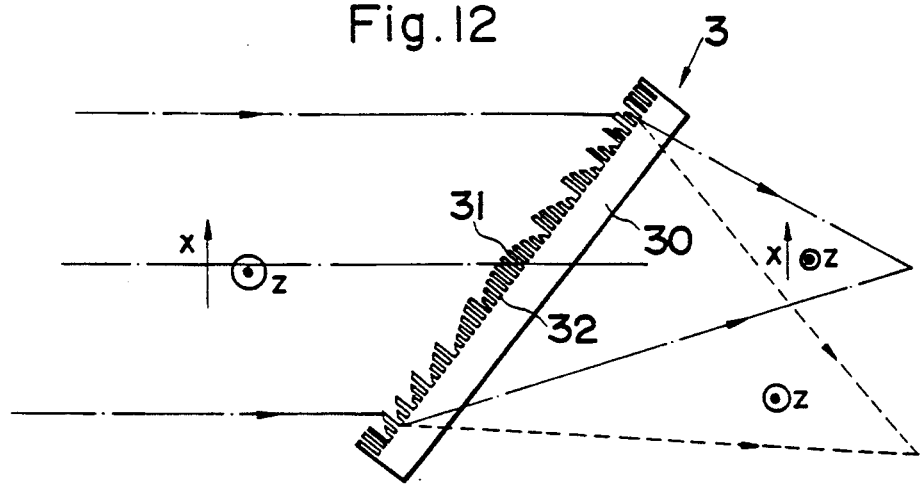
FIG. 12 is a schematic diagram useful to explain a polarization separating operation developed by the optical device of the third embodiment.

This configuration includes an optical element 3 having a high-density grating 32, which is employed as a polarization beam splitter developing a light focusing function. The optical element 3 is arranged, as shown in FIG. 12, in an inclined location so as to satisfy the Bragg condition with respect to the diffraction of an incident light. In the optical element 3, a light polarized along a grating direction (a longitudinal direction of the grating = Z-axis direction) is diffracted as designated by broken (dot) lines under the Bragg condition so as to be focused through the Fresnel lens. Lights polarized in the other directions do not undergo the Bragg diffraction as indicated by dot-and-dash lines so as to be simply focused by the Fresnel lens. In short, the optical element 3 develops a polarization separating function to separate the incident light depending on polarization directions and a function to focus the light. For details about the polarization separating function, reference is made to "Diffraction Characteristics of Photoresist Surface-Relief Gratings" written by M. G. Moharam et al. in pages 3214 to 3220 of Applied Optics, Vol. 23, No. 18, Sept. 15, 1984.

Figure 13:
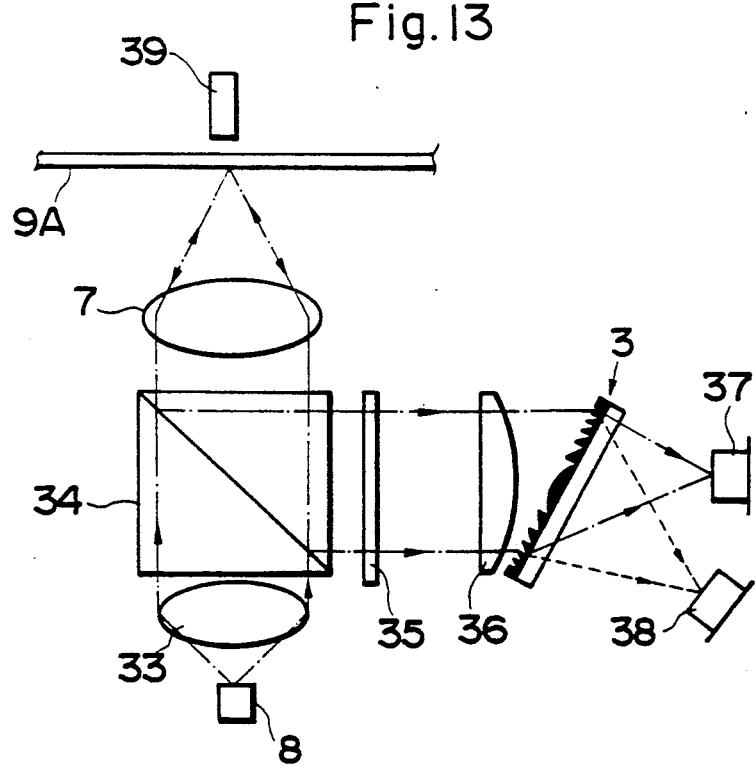
FIG. 13 is a diagram showing the optical configuration of an optical pickup device using the optical element of FIG. 9.

FIG. 13 shows an example in which the optical element 3 is adopted in an optical pickup device which reads out data from an opto-magnetic or magneto-optical disk.

In this sytem, the semiconductor laser 8 emits a light, which is collimated by a collimator lens 33. The collimated beam is passed through a polarization beam splitter 34 producing a linearly polarized light so as to be focused by an objective 7 onto a magneto-optical disk 9A. When the light of the linear polarization is thus irradiated onto a surface of the magneto-optical disk 9A. The polarization plane thereof rotates in association with a magnetically recorded item on the disk 9A (by virtue of the Kerr effect and the Faraday effect). A light reflected from the surface of the disk 9A is then collimated by the objective 7 so as to be led via the polarized beam splitter 34 into a light receiving system. The optical system to receive the light is constituted with a ½-wavelength plate 35, a cylindrical lens 36, the optical element 3, and two light receiving elements 37 and 38. The light receiving element 37 comprises four independent light receiving portions. Owings to the cylindrical lens 36 and the Fresnel lens of the optical element 3, the light causes astigmatism and a light associated with the astigmatism is received by the light receiving element 37. In consequence, by use of the signals produced from the light receiving element 37, a focusing error signal is created in the astigmatic method and a tracking error signal is attained in the push-pull method as described above. On the other hand, the light diffracted by the optical element 3 under the Bragg condition is then received by the light receiving element 38. Depending on a difference between output signals from the light receiving elements 37 and 38, the system produces a signal representing the rotation of the polarization plane, namely, data magnetically recorded on the disk 9A. In this configuration, a reference numeral 39 designates a magnet (or an electromagnet) employed to write data on the opto-magnetic disk 9A.

FIGS. 14a to 14c schematically show a method of manufacturing the optical element 1, 2, or 3 above.

In the manufacturing method, a composite grating pattern of the optical element to be produced is formed by use of a electronic beam lithography or the like. The obtained pattern is employed as an original mold to create a stamper 14 through methods such as the transcription and electroforming methods (FIG. 14a).

Subsequently, on a transparent substrate 10 formed with a material such as glas, a transparent resin 13 of an ultraviolet ray setting type is applied (FIG. 14b) and then the stamper 14 is located on the coated resin 13. While applying an appropriate pressure between the stamper 14 and the substrate 10, an ultraviolet ray is irradiated from the side of the substrate 10 onto the resin 13, which is solidified as a result (FIG. 14c). When the stamper 14 is thereafter removed, there is produced an optical element in which the composite grating pattern is formed on the substrate 10. Both of the substrate 10 and the composite grating pattern may be integrally manufactured by use of a resin.

Figure 16:
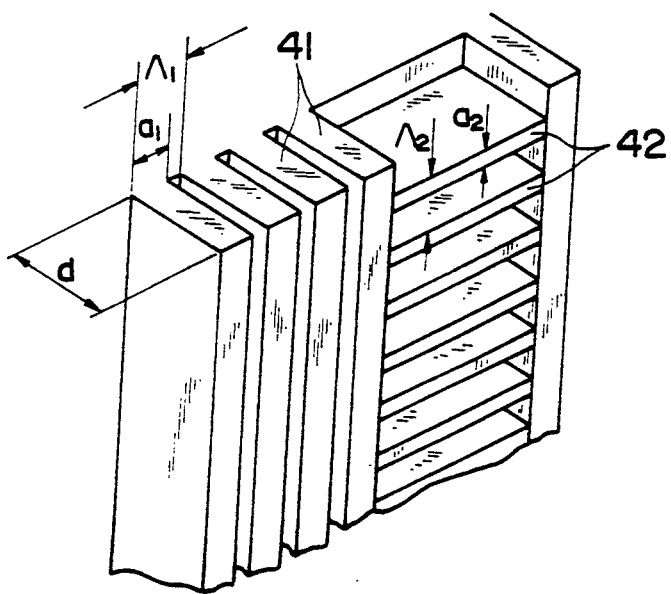
FIG. 16 is a magnified view illustratively showing a portion of the device of FIG. 15.

FIGS. 15 and 16 show an optical element as a fourth embodiment in accordance with the present invention.

In this optical element 4, two kinds of ultra high-density equally-spaced linear gratings 41 and 42 each having a period not exceeding half the wavelength λ of the incident light are formed on a substrate 40. The first gratings 41 are disposed with an appropriate interval therebetween. An envelope of the first gratings 41 represents a third linear grating with an unequal interval as indicated by dot-and-dash lines. In this embodiment, the third grating 43 is an unequally separated grating with the minimum interval (period) not less than the wavelength λ of the incident light. In portions associated with grooves of the third grating 43, there is disposed a second ultra high-density grating 42, which is orthogonal to the first ultra high-density grating 41. These gratings 41 and 42 has an identical thickness (depth).

Figure 18:
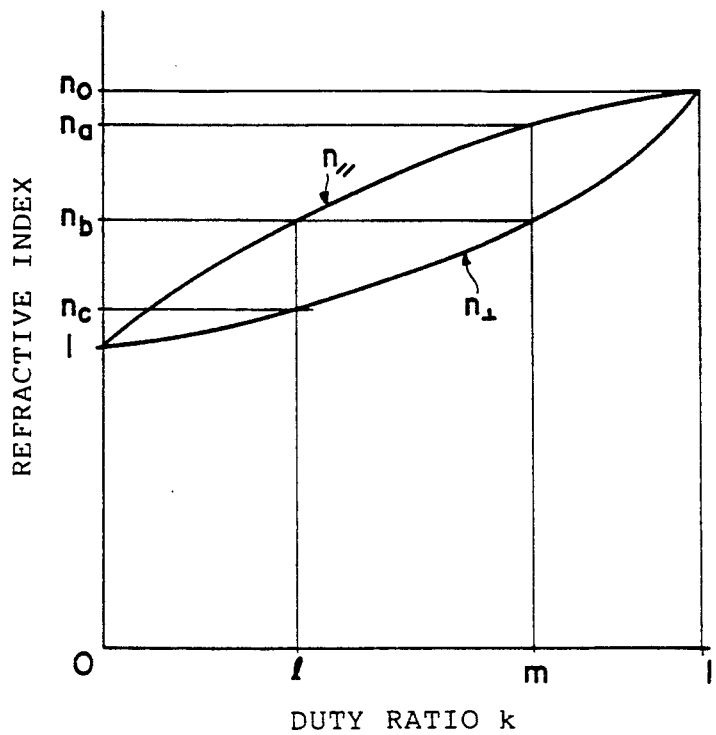
FIG. 18 is a graph representing relationships between a duty ratio and a refractive index.

In an ultra high-density grating with a period not exceeding half the wavelength λ of the incident light, the light is diffracted. When the grating period is larger than the incident wavelength, however, the light passes through. The grating develops a birefringence (complex index of refraction) characteristic with respect to the incident light, namely, the refractive index varies depending on the polarization direction of the incident light. Let us assume the period of the first ultra high-density grating 41 and the width of the projected stripe (ridge) to be represented as $\Lambda_1$ and $a_1$, respectively and the period of the second ultra high-density grating 42 and the width of the projected stripe to be denoted as $\Lambda_2$ and $a_2$, respectively. The duty ratios k of these gratings 41 and 42 are then expressed as $a_1/\Lambda_1$ and $a_2/\Lambda_2$, respectively. Since the ultra high-density gratings 41 and 42 develop the birefringence characteristic, the value of a refractive index $n_\parallel$ thereof with respect to a light polarized in a direction parallel to the gratings (along a longitudinal direction of the gratings) is different from that of a refractive index $n_\perp$ with respect to a light vertical to the gratings. Moreover, the refractive index values $n_\parallel$ and $n_\perp$ vary depending on the duty ratio k as shown in FIG. 18. In this graph, $n_0$ is a refractive index of a medium of the grating and 1 denotes a refractive index of air. A refractive index $n_\parallel$ (l) in a direction parallel to the gratings when the duty ratio is l and a refractive index $n_\perp$ (m) in a direction vertical to the gratings when the duty ratio is m take the indentical value $n_b$.

Figure 17:
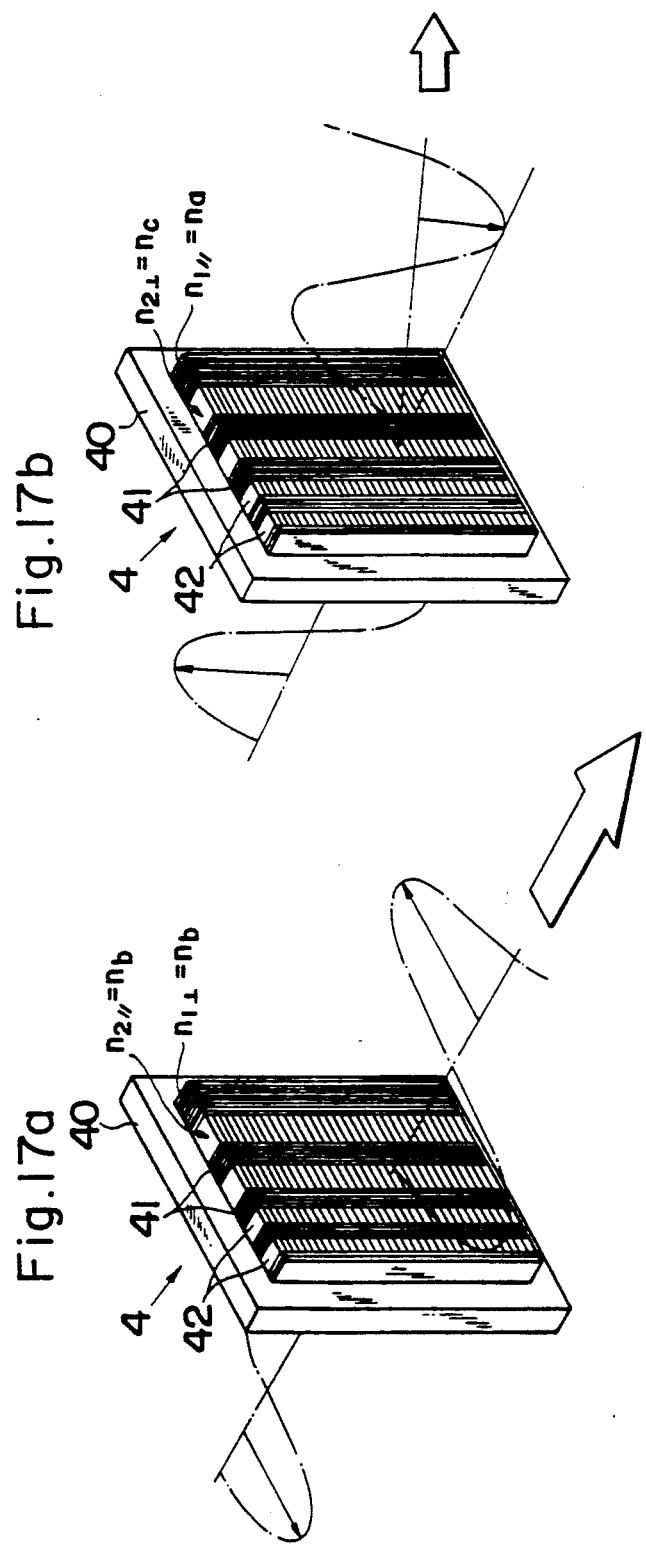
FIGS. 17a and 17b are schematic diagrams useful to explain the function implemented by the optical device of FIG. 15.

For discrimination between the respective refractive indices of the ultra high-density gratings 41 and 42, subscripts 1 and 2 are added to the index representations $n_\parallel$ and $n_\perp$, respectively. In order to attain relationships $n_{1\perp} = n_{2\parallel} = n_b$, the duty ratios of these gratings 41 and 42 (expressed as m and l, respectively) are determined. Under this condition, as shown in FIG. 17a, since with respect to an incident light polarized in a direction vertical to the direction of the grating 41 (parallel to the direction of the grating 42), the optical element 4 becomes to be a plate-like body having a fixed refractive index and the incident light passes through the optical element 4. Namely, a diffraction phenomenon does not take place. When the grating duty ratios are selected as described above, from the graph of FIG. 18, relationships $n_{1\parallel} = n_a$ and $n_{2\perp} = n_c$ ($n_a \neq n_c$) are obtained. For an incident light polarized in a direction parallel to the direction of the grating 41 (vertical to the direction of the grating 42), the optical element 4 becomes to be a grating in which the refractive index varies with a period of the third grating 43. In consequence, as shown in FIG. 17b, the incident light above is diffracted by the grating 43. Resultantly, the optical element 4 develops a function of a polarized beam splitter. Furthermore, since the period of the grating 43 changes along the direction of the width thereof, the optical element 4 serves a function equivalent to the function of a cylindrical grating lens.

Figure 19:
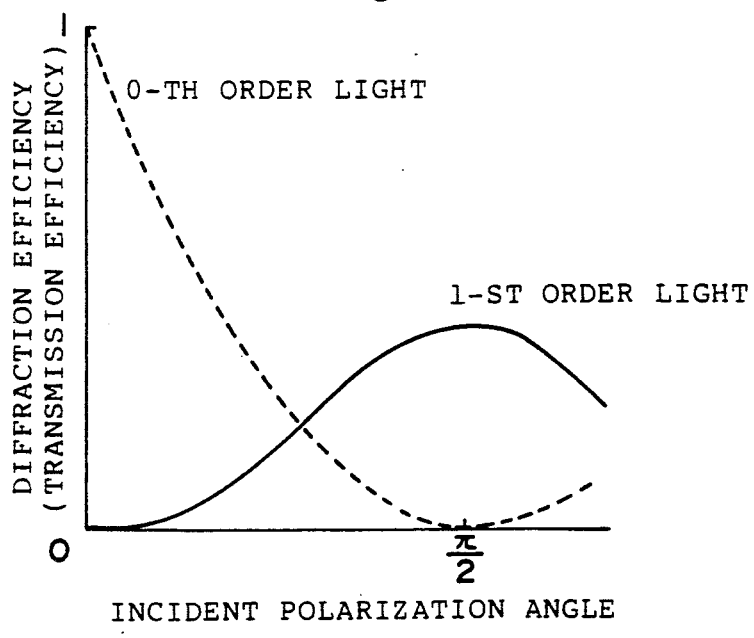
FIG. 19 is a graph illustratively showing relationships between an incident polarization angle and a diffraction efficiency.

Since the difference between the refractive index values associated with the projected stripe and the groove of the grating 43 is $n_a - n_c$, the maximum diffraction efficiency (of the first-order diffraction light) is atained for a grating thickness d (FIG. 16) equal to $\lambda/2(n_a - n_c)$. FIG. 19 shows diffraction efficiency values of the diffracted light of the first order (solid line) and transmission efficiency of the light of the 0-th order (dot lines) with respect to a polarization angle of the incident light, where the polarization angle of the incident light shown in FIG. 17a is assumed to be 0 degree.

In a case, for example, where the gratings 41 and 42 are produced by use of an ultraviolet ray setting resin of n=1.57, for l=0.41 and m=0.67, the value of $n_b$ is 1.27. Furthermore, $n_a = 1.41$ and $n_c = 1.15$ are attained. The thickness d in this case is set as 1.52 micrometers. Incidentally, the wavelength λ of the incident light is 0.78 micrometers.

Figure 20:
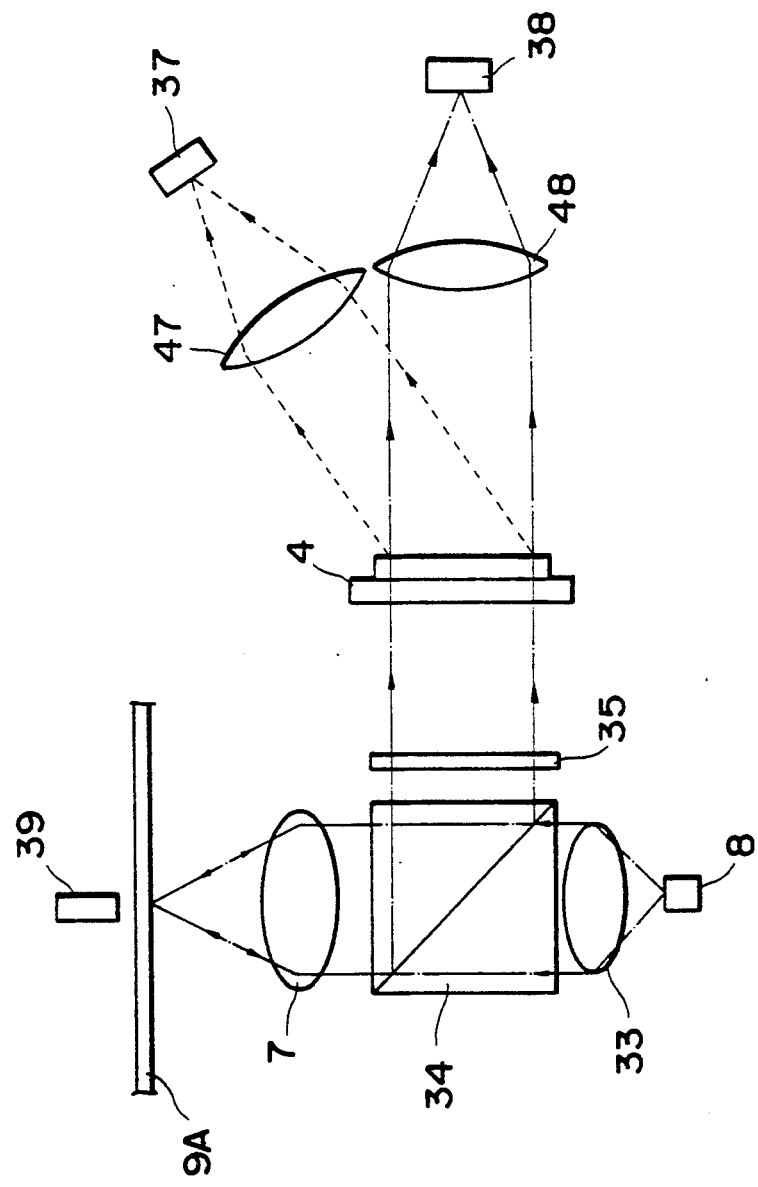
FIG. 20 is a schematic diagram showing the optical constitution of an optical pickup device utilizing the optical element of FIG. 15.

The optical device 4 above is applicable to an optical pickup device for an opto-magnetic disk as shown in FIG. 20. In the configuration of FIG. 20, the constituent components identical to those of FIG. 13 are assigned with the same reference numerals. In place of the cylindrical lens 36 and the optical element 3 of FIG. 13, the system of FIG. 20 includes an optical element 4 and focusing lenses 47 and 48. Of the reflected light from the opto-magnetic disk 9A, a light diffracted by the optical element 4 is transmitted via the focusing lens 47 to a light receiving element 37, which in turn produces outputs. Based on the outputs, the system creates a focusing error signal and a tracking error signal. The light passing through the optical element 4 is sent via the focusing lens 48 to a light receiving element 38, which then generates an output. Using the output signals from the light receiving elements 37 and 38, the system produces a read-out signal.

Figure 21A:
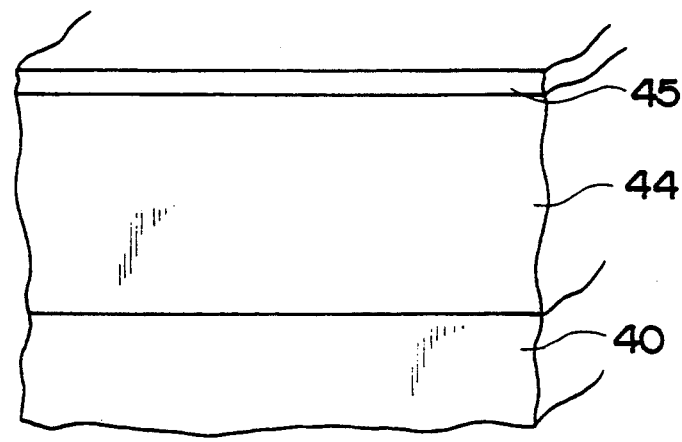
FIGS. 21a to 21c are explanatory diagrams useful to explain a method of manufacturing the optical element of FIG. 15.
Figure 21B:
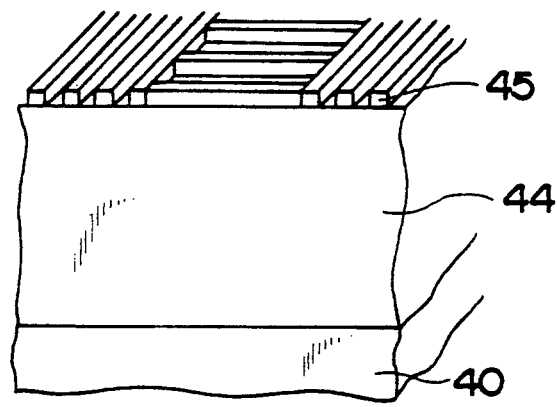
Figure 21C:
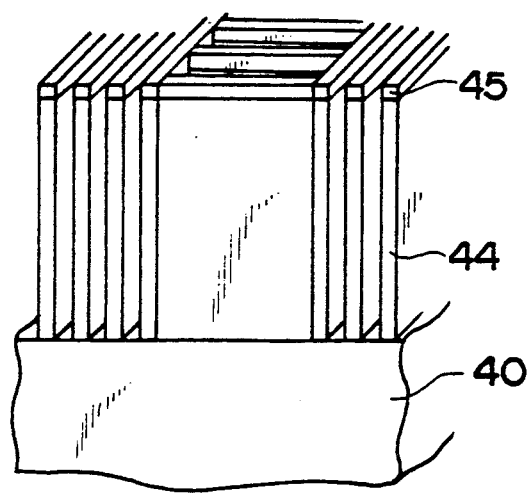

FIGS. 21a to 21c illustratively show a method of manufacturing the optical element 4. In accordance with this method, on a substrate 40, there is applied a thick layer of a resist or other medium 44 which develops a high etching rate in a reactive ion etching (or an ion beam etching). The medium 44 is then coated with a thin film of an electronic beam resist 45 of a low etching rate (FIG. 21a). By use of an electron beam lithography, ultra high-density gratings in association with the gratings 41 and 42 are formed on the electron beam resist 45 (FIG. 21b). Finally, with the ultra high-density gratings of the electron beam resist set as a mask, a reactive ion etching is conducted thereon to etch the medium 44 (FIG. 21c). The gratings have a thickness d to be controlled depending on thicknesses of the resist 45 and the medium 44, respectively.

By using as a mold the optical element thus produced, a stamper can be manufactured to reproduce the optical element 4 based thereon.

In the embodiment above, the third cylindrical grating is formed as a cylindrical grating lens. However, any other types of gratings such as an equally separated grating and a grating in a form of an arc may be employed.

While particular embodiments of the invention have been shown and described, it will be obvious to those skilled in the art that various changes and modifications may be made without departing from the present invention in its broader aspects.

We claim:

1. An optical element comprising:
    a substrate; and
    a composite grating pattern formed on said substrate, said composite grating pattern including a grating pattern of a Fresnel lens pattern and an unequally separated linear grating pattern both being superimposed on said substrate.

2. An optical element comprising:
    a substrate; and
    a composite grating pattern formed on said substrate and including two different kinds of grating patterns being superimposed on said substrate;
    wherein one of said two kinds of grating patterns is a Fresnel lens pattern having an interval not less than a wavelength of a light incident thereto and another one of said grating patterns is a high-density and equally separated linear grating pattern having a period between a wavelength of a light incident thereto and half the wavelength.

3. An optical element comprising two kinds of ultra high-density gratings including first and second kind of ultra high-density gratings, each being orthogonal to each other and each having a period not exceeding half a wavelength of a light incident thereto,
    said first kind of ultra high-density grating being arranged such that an envelope pattern thereof represents a third grating with an interval not less than the wavelength of the incident light.
    said second kind of ultra high-density grating being disposed in a portion associated with grooves of said third grating, and
    said first and second kind of ultra high-density gratings being formed with an identical thickness.

4. An optical element in accordance with claim 3 wherein said two kinds of ultra high-density gratings respectively have duty ratios selected to equalize a refractive index of said first kind of ultra high-density grating in a direction orthogonal to said grating to a refractive index of said second kind of ultra high-density grating in a direction parallel to said grating.

5. An optical element in accordance with claim 3 wherein said third grating represented with said envelope pattern is an unequally separated grating.

6. An optical pickup device comprising an optical element which splits a laser light from a laser light source into three light beams and which collimates these light beams into an objective;
    said optical element including a substrate and a composite grating pattern formed on said substrate;
    said composite grating patterns including a Fresnel lens pattern and an equally separated linear grating pattern superimposed on said substrate.

7. An optical pickup device comprising an optical element leading to a light receiving element a light which is reflected from an optical recording medium and which is collimated through an objective;
    said optical element including a substrate and a composite grating pattern formed on said substrate;
    said composite grating patterns including a Fresnel lens pattern and an unequally separated linear grating pattern superimposed on said substrate.

8. An optical pickup device comprising optical elements including an optical element leading to a light receiving element for a light reflected from an opto-magnetic recording medium;
    said optical element including a substrate and a composite grating pattern formed on said substrate;
    said composite grating pattern including a Fresnel lens pattern and a high-density equally separated linear grating pattern having a period between a wavelength of the reflected light and half the wavelength, said Fresnel lens pattern and said high-density equally separated linear grating pattern being superimposed on said substrate.

9. An optical pickup device comprising optical elements including an optical element leading to a light receiving element a light reflected from an opto-magnetic recording medium,
    said optical element comprising two kinds of ultra high-density gratings including first and second kind of ultra high-density gratings, each being orthogonal to each other and each having a period not exceeding half a wavelength of a light incident thereto,
    said first kind of ultra high-density grating being arranged such that an envelope pattern thereof represents a third grating with an interval not less than the wavelength of the incident light,
    said second kind of ultra high-density grating being disposed in a portion associated with grooves of said third grating, said first and second kind of ultra high-density gratings being formed with an identical thickness, said two kinds of ultra high-density gratings respectively having duty ratios selected to equalize a refractive index of said first kind of ultra high-density grating in a direction orthogonal to said grating to a refractive index of said second kind ultra high-density grating in a direction parallel to said grating, said third grating represented by said envelope pattern being an unequally separated grating.

* * * * *